United States Patent
Choi et al.

(10) Patent No.: US 7,441,687 B2
(45) Date of Patent: *Oct. 28, 2008

(54) DESOLDERING SHEATH

(76) Inventors: Criswell Hyunsoo Choi, 1042 Fernleaf Dr., Sunnyvale, CA (US) 94086; Moon Gul Choi, 4137 Ambrosia La., Plano, TX (US) 75093

( * ) Notice: Subject to any disclaimer, the term of this patent is extended or adjusted under 35 U.S.C. 154(b) by 118 days.

This patent is subject to a terminal disclaimer.

(21) Appl. No.: 11/368,237

(22) Filed: Mar. 3, 2006

(65) Prior Publication Data

US 2006/0191977 A1    Aug. 31, 2006

Related U.S. Application Data

(63) Continuation-in-part of application No. 10/802,065, filed on Mar. 16, 2004.

(51) Int. Cl.
*B23K 1/00* (2006.01)
*B23K 3/02* (2006.01)

(52) U.S. Cl. .............................. 228/19; 228/51; 228/54; 228/55; 228/191; 228/264

(58) Field of Classification Search ........................ None
See application file for complete search history.

(56) References Cited

U.S. PATENT DOCUMENTS

| | | | | |
|---|---|---|---|---|
| 3,172,382 A | * | 3/1965 | Weglin | 228/20.5 |
| 3,580,462 A | * | 5/1971 | Vanyi | 228/51 |
| 4,416,408 A | * | 11/1983 | Spirig | 228/19 |
| 5,072,874 A | * | 12/1991 | Bertram et al. | 228/264 |
| 5,083,698 A | * | 1/1992 | Forsha | 228/160 |
| 5,094,139 A | * | 3/1992 | Forsha | 87/9 |
| 5,305,941 A | * | 4/1994 | Kent et al. | 228/19 |
| 5,901,898 A | * | 5/1999 | Strempke | 228/19 |
| 6,386,423 B1 | * | 5/2002 | Adler et al. | 228/54 |
| 7,030,339 B2 | * | 4/2006 | Nagase et al. | 219/229 |
| 7,134,590 B2 | * | 11/2006 | Choi et al. | 228/19 |
| 2004/0222206 A1 | * | 11/2004 | Nagase et al. | 219/229 |
| 2004/0226981 A1 | * | 11/2004 | Nagase et al. | 228/51 |
| 2004/0226982 A1 | * | 11/2004 | Nagase et al. | 228/51 |
| 2005/0011876 A1 | * | 1/2005 | Uetani et al. | 219/229 |
| 2006/0022018 A1 | * | 2/2006 | Yoshimura et al. | 228/54 |

* cited by examiner

*Primary Examiner*—Kiley Stoner
(74) *Attorney, Agent, or Firm*—Carstens & Cahoon LLP (57) ABSTRACT

The present invention provides a desoldering sheath and a method for making the same. The desoldering sheath is comprised of multiple metal ropes that are each made from two or more fine-gauge wire threads. The metal ropes are woven together to form a metal fabric that approximates the shape of a soldering tool tip. The metal fabric is formed by weaving the metal ropes around a mold that approximates the shape of the soldering tip. In the preferred embodiment, several such molds are strung together when the metal fabric is woven. After the weaving is complete, the fabric is then cut at those points along its length where the consecutive molds meet, and the molds are then removed, while the fabric retains the approximate shape of the molds. The desoldering sheath is mounted over a soldering tool tip and can conduct heat directly from the soldering tool to the solder and then absorb molten solder by capillary action, making desoldering a one-handed task.

20 Claims, 8 Drawing Sheets

DESOLDERING SHEATH

CROSS REFERENCE TO RELATED APPLICATION

This application is a continuation in part of U.S. patent application Ser. No. 10/802,065 entitled "Desoldering Sheath" filed Mar. 16, 2004 the technical disclosures of which are hereby incorporated herein by reference.

BACKGROUND OF THE INVENTION

1. Technical Field

The present invention relates generally to desoldering equipment, and more specifically to a desoldering sheath for use with a desoldering gun or iron.

2. Description of Related Art

Desoldering is a process for removing solder from a printed circuit board (PCB). Known methods for desoldering require two pieces or equipment, a desoldering gun (or a desoldering iron) and a device to remove the solder affixed to the PCB. The desoldering gun serves as a heat source for the desoldering operation. The desoldering gun includes a metal tip that is used to transfer heat to both the solder and the device used to remove the solder. The tip of the desoldering gun generally has either a tapered shape (i.e. conical or pointed) or a square shape.

Conventional devices used to remove solder include vacuum pumps and solder wicks. A vacuum pump, also known as a solder sucker, is a suction device resembling a large syringe. The vacuum pump includes a spring loaded plunger to create suction. The plunger starts in a pushed down position, and a button is used to release the plunger whenever suction is required. As the plunger rises, a vacuum is created at the nozzle of the pump which draws molten solder into the vacuum pump, thereby removing the solder from the PCB. A user holds the desoldering gun in one hand and places the tip against the solder to melt it. The vacuum pump is held in the other hand to collect the melted solder.

A solder wick is a braid of metal, generally copper, used to collect molten solder, like a sponge. The solder wick has no moving parts and is generally positioned between the desoldering gun and the solder when used. The heat from the desoldering gun is transferred to the solder through the solder wick. For example, a user holds the desoldering gun in one hand and the solder wick in the other, placing the solder wick against the solder and heats the wick using the tip of the desoldering gun. The heat is transferred to the solder through the solder wick, and as the solder melts, it is collected by the wick.

The use of these conventional methods for removing solder has its drawbacks. One important disadvantage is that both the vacuum pump method and the solder wick method are two-handed operations. The user must hold the desoldering gun in one hand and the vacuum pump or solder wick with the other. This present problems for some used who have a difficult time holding the vacuum pump or solder wick in intimate contact with the solder as the solder is being heated by the desoldering gun. In this situation, if the user moves the desoldering gun away from the solder too soon, the solder may quickly re-solidify and the tip of the vacuum or the solder wick may become affixed to the solder.

Another disadvantage of the vacuum pump is that the solder hardens within the pump after it has been removed from the PCB. It then becomes a tedious task to remove this hardened solder from the pump.

Therefore, it would be desirable to have an improved device for desoldering that only requires one hand for operation and avoids the inconvenience of having to remove solid solder from a vacuum pump.

SUMMARY OF THE INVENTION

The present invention provides a desoldering sheath and a method for making the same. The desoldering sheath is comprised of multiple metal ropes that are each made from two or more fine-gauge wire threads. These threads can be made from copper, stainless, steel, silver, gold or other suitable conductive metal. The metal ropes are woven together to form a metal fabric that approximates the shape of a soldering tool tip. The metal fabric is formed by weaving the metal ropes around a mold that approximates the shape of the soldering tip. In the preferred embodiment, several such molds are strung together when the metal fabric is woven. After the weaving is complete, the fabric is then cut at those points along its length where the consecutive molds meet, and the molds are then removed, while the fabric retains the approximate shape of the molds.

The desoldering sheath can be mounted over a soldering tool tip. In the preferred embodiment, a grommet made of conductive material is inserted into the end of the sheath that fits over the soldering tip. The desoldering sheath can conduct heat directly from the soldering tool to the solder and then absorb the molten solder by capillary action, making desoldering a one-handed task.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The present invention comprises a desoldering sheath that can be used in conjunction with a desoldering gun (or a desoldering iron) to remove solder from, e.g., a printed circuit board (PCB). The desoldering sheath is configured to be placed directly over the tip of a solder gun, coving the tip substantially in its entirety. This configuration enables a user to perform one-handed desoldering.

Figure 1:
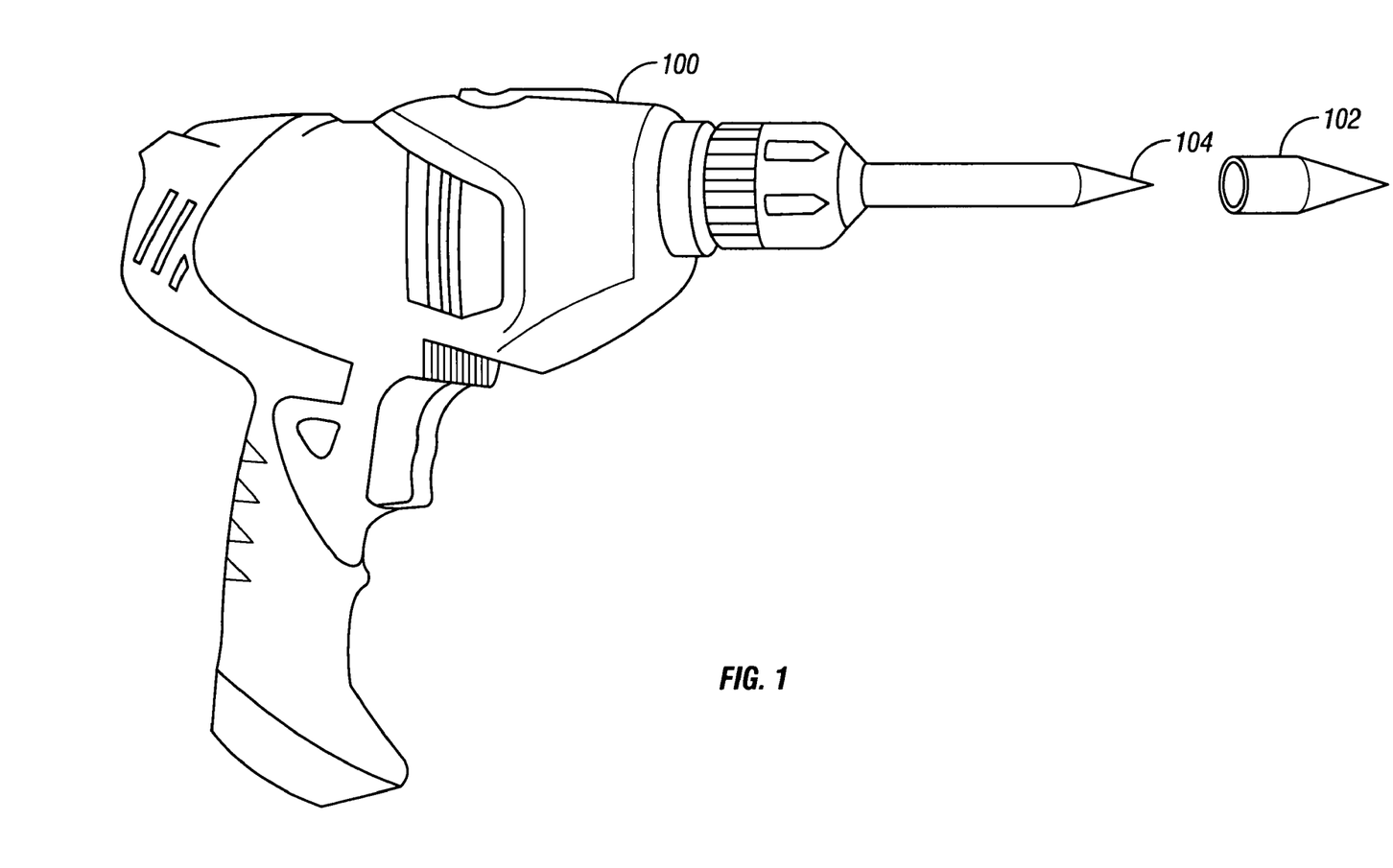
FIG. 1 shows a desoldering gun and a desoldering sheath in accordance with one embodiment of the present invention.

FIG. 1 shows a desoldering gun and a desoldering sheath in accordance with one embodiment of the present invention. The desoldering gun 100 includes a cone-shaped tip 104 through which heat can be transmitted. During a conventional desoldering, the tip 104 is heated and placed into contact with solid solder that is to be removed. The heat from the tip 104 is transmitted to the solder, causing it to melt. The molten solder is then captured using the solder wick (also called a soldering braid). The solder wick is placed in contact with the melted solder and is often placed in between the tip 104 and the solder, wherein the heat from the tip is conducted through the wick to the solder, preventing the solder from re-solidifying before it is fully captured by the solder wick. However, this is a two-handed procedure.

Figure 2:
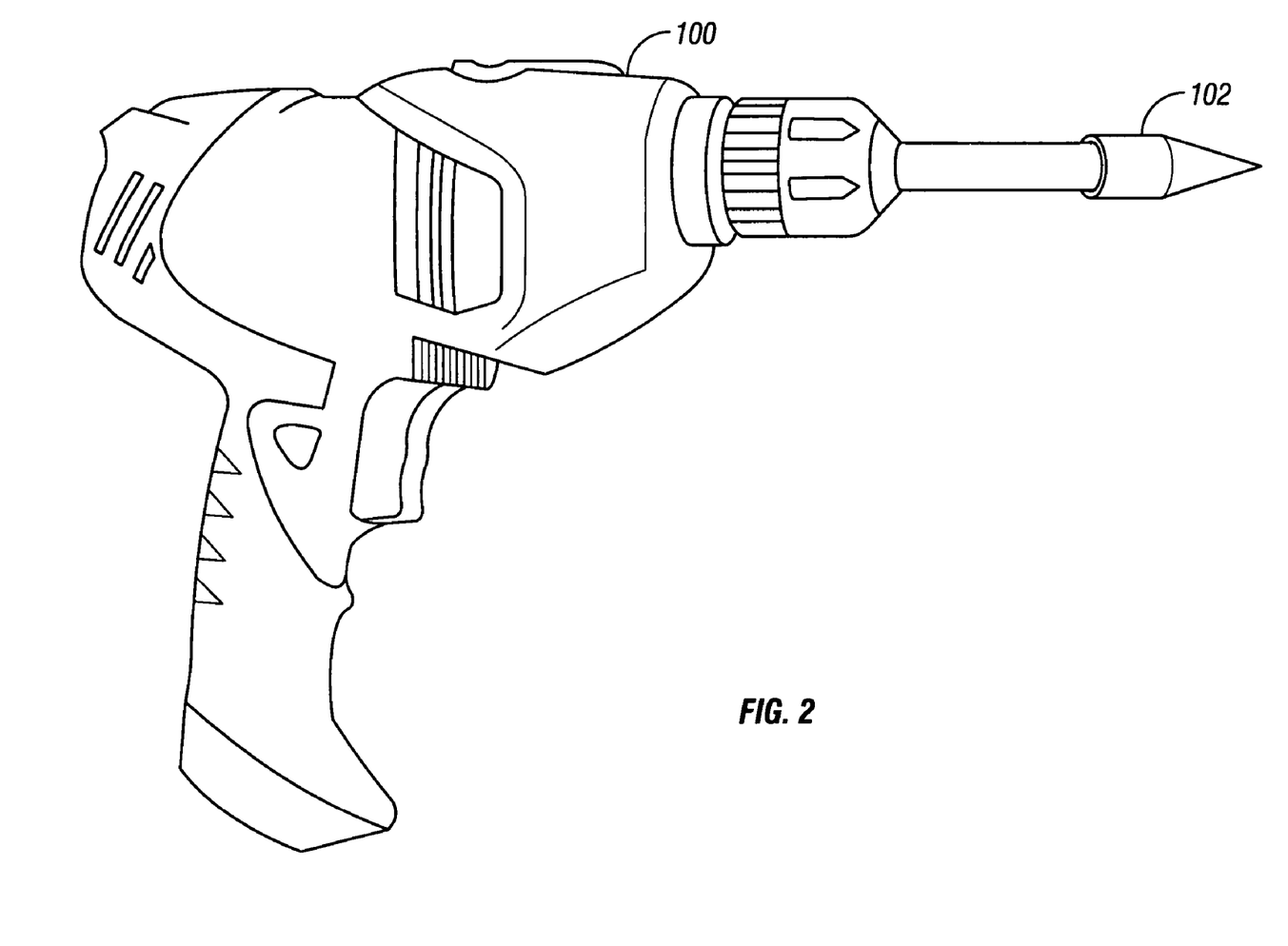
FIG. 2 illustrates a desoldering sheath mounted onto the tip of a desoldering gun in accordance with an embodiment of the present invention.

The desoldering sheath 102 in FIG. 1 replaces the conventional soldering wick but has the same solder capturing properties as a solder wick. The shape of the sheath 102 conforms to the tip 104 of the soldering gun 100, enabling the sheath to fit over the tip, as shown in FIG. 2. Thus, when the tip 104 is subsequently heated, there is an efficient transfer of heat from the tip to the desoldering sheath 102. This heat transfer allows the desoldering sheath 102 to heat up and melt solid solder and capture it after is has melted. Since the sheath 102 is mounted on the tip 104 of the desoldering gun 100 and does not need to be handled separately from the gun, the present invention allows desoldering to become a one-handed procedure.

Figure 3:
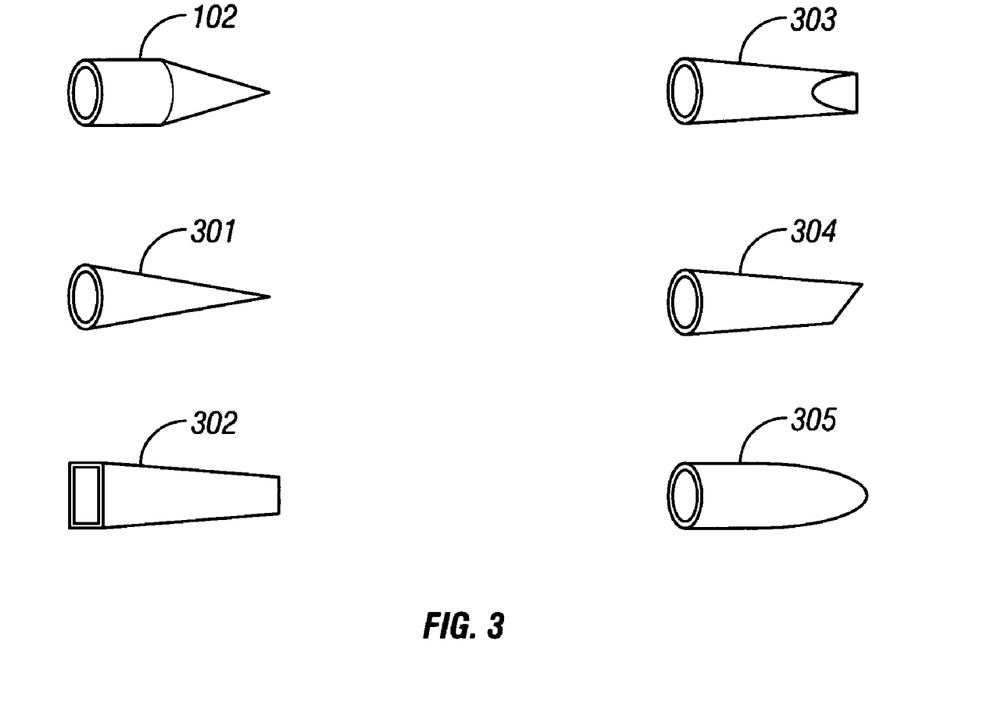
FIG. 3 depicts several examples of desoldering sheath shapes in accordance with the present invention.

FIG. 3 depicts several examples of desoldering sheath shapes in accordance with the present invention. The different shapes shown in FIG. 3 correspond to the shapes of tips of commonly available soldering guns. In accordance with the method of the present invention, desoldering sheaths can be constructed to fit over any desoldering gun tips available on the market. For example, the desoldering sheath 102 demonstrated in FIGS. 1 and 2 is cone-shaped and designed to fit the con-shapes tips of commonly used soldering guns. However, other tips shapes are available for soldering guns, and example sheathes 301-305 illustrated how the present invention can accommodate these other shapes.

Sheath 301 is an example of a more elongated cone shape. Sheath 302 is a square-shaped desoldering sheath. The edge-shaped desoldering sheath 303 is flat and tapered at the end, similar to a flat-head screwdriver. Other possible variations include an angled-edge sheath 304 and a rounded-end cone-shaped desoldering sheath 305. Other shapes are possible beyond the examples depicted in FIG. 3. The example shapes are presented to illustrate the adaptability of the present invention to particular user needs.

Figure 4:
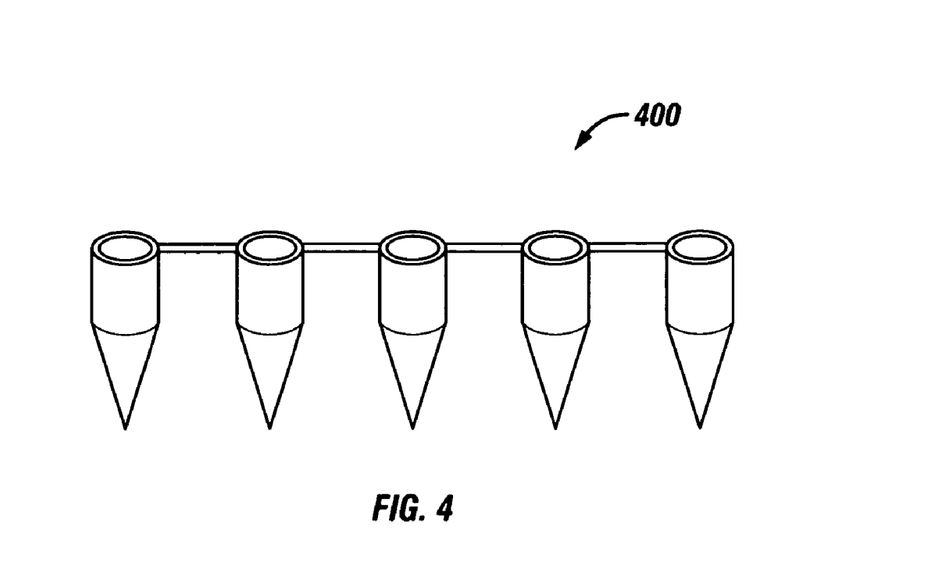
FIG. 4 shows an embodiment of the present invention wherein multiple desoldering sheaths are coupled together to form a sheath array.

FIG. 4 shows an embodiment of the present invention wherein multiple desoldering sheaths are coupled together to form a sheath array. The desoldering sheath array 400 provides a continuous strand of desoldering material to perform desoldering operations. A use can use one desoldering sheath of the array 400 until that sheath is exhausted (no longer collect molten solder) and then quickly move on to the next sheath in the array. This configuration provides greater convenience to the user in those situations involving a relatively large volume of solder.

In the preferred embodiment of the present invention, the desoldering sheath is hollow. The hollow interior of the sheath provides a capillary action when placed into contact with molten solder, thereby capturing the solder from, e.g., a PCB. The sheath will typically be formed using a metal such as copper. However, other metals can also be used if they have the necessary heat transfer characteristics and produce similar capillary action.

Figure 5:
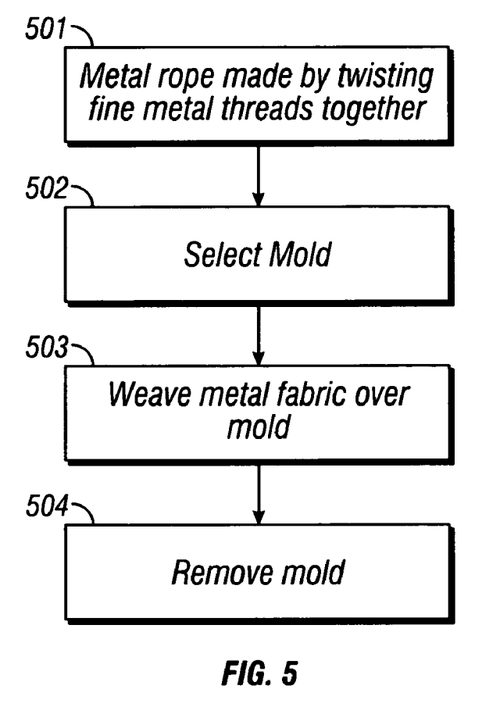
FIG. 5 is a flowchart illustrating the process for constructing a desoldering sheath in accordance with a preferred embodiment of the present invention.

FIG. 5 is a flowchart illustrating the process for constructing a desoldering sheath in accordance with a preferred embodiment of the present invention. The process utilizes fine gauge metal threads to form a metal fabric. The metal threads generally have a fine enough gauge (e.g., 0.01-1.0 mm) to allow them to be weaved into a metal fabric. In one embodiment, the metal threads used to form the metal fabric can have a gauge that ranges from 0.01-0.10 mm. The metal used to form the threads can be selected from any metal known to be acceptable for desoldering operations. In the preferred embodiment of the invention, copper threads are used to form the metal fabric. However, other heat conductive metals such as stainless steel, silver and gold can be used. The material should have a higher melting temperature than the solder.

The fabrication process begins with at least two fine gauge metal threads being twisted or braided together to form a metal rope (step 501). In the preferred embodiment, five to ten fine gauge metal threads are used to form the metal rope. Several metal ropes are generally made since they are used to manufacture the metal fabric for the hollow desoldering sheath.

Next, a mold is selected for the weaving process (step 502). The metal fabric will be woven onto the mold to form a hollow metal sheath. Accordingly, the diameter of the mold defines the diameter and shape of the hollow sheath. Different sized and shaped molds may be used to enable the manufacture of sheaths of differing shapes. Typically, the diameter of the mold will range from 0.10 to 10 mm. Different shapes of desoldering sheaths (such as shown in FIG. 3) will obviously require different diameters of molds.

A textile machine then weaves several metal ropes into a fabric wrapped around the mold (step 503). The metal ropes are woven at least once, and in the preferred embodiment of the invention, the metal fabric is formed by weaving the metal ropes two to five times depending on the size and shape of the tip around a mold, wherein each weaving adds another layer of metal ropes to the fabric. After the metal fabric has been woven on the mold, the mold is removed and the woven metal fabric now forms a hollow sheath (step 504).

Figure 6A:
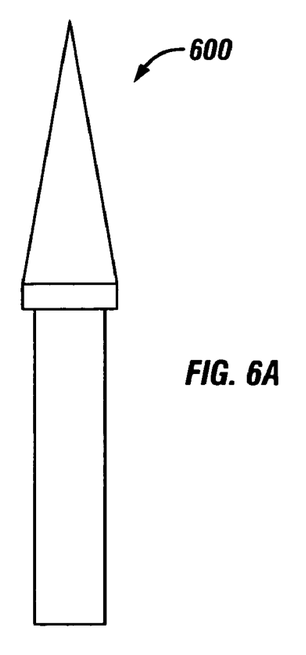
FIG. 6A shows the shape of a common soldering tip.
Figure 6B:
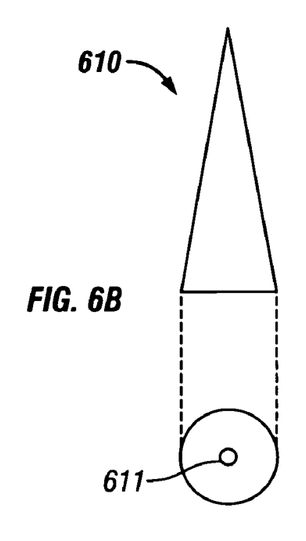
FIG. 6B shows the side view and bottom end view of a conical desoldering sheath mold.

FIG. 6A shows the shape of a common soldering tip. In order to manufacture a desoldering sheath that will properly mount over this soldering tip 600, a mold having a similar shape and diameter is used. FIG. 6B shows both a side view of the mold 610 and an end on view of the bottom of the mold revealing a hole 611 running through the center.

Figure 6C:
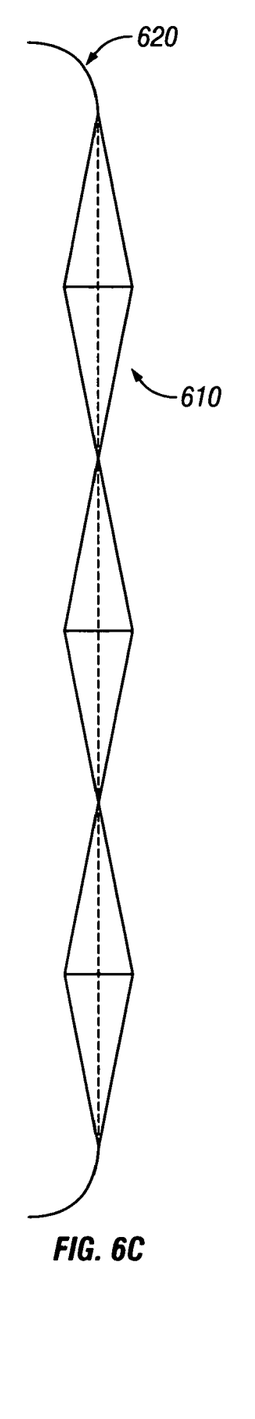
FIG. 6C shows a plurality of conical desoldering sheath molds strung together on a wire.
Figure 6D:
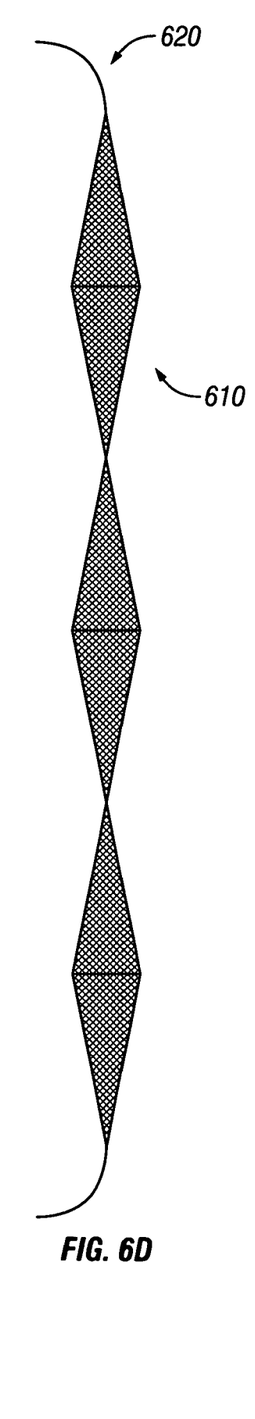
FIG. 6D show a metal fabric woven over the molds from FIG. 6C.

FIG. 6C shows several conical molds 610 strung together on a wire 620 that runs through the center of the molds. The metal fabric comprised of fine gauge threads is then woven over the strung-together conical molds, thus assuming the shape of the molds 610 as shown in FIG. 6D.

Figure 6E:
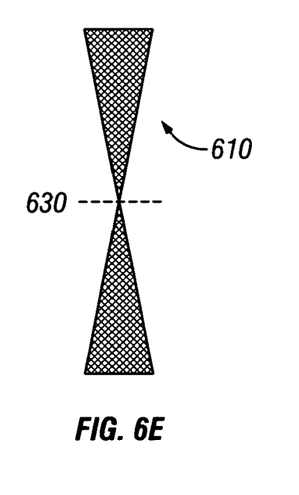
FIG. 6E shows a section of woven metal fabric conforming to two conical molds.

Once the metal fabric has been woven over the molds, the wire is removed from the center of the molds and the metal fabric is cut at the points between the wide ends of the molds, producing several segments of metal fabric like that depicted in FIG. 6E. Each of these segments includes two shaped molds, which can now be removed from the open ends. The remaining metal fabric can then be cut at the narrowest point in the middle, indicated by line 630, producing two desoldering sheaths.

Figure 7A:
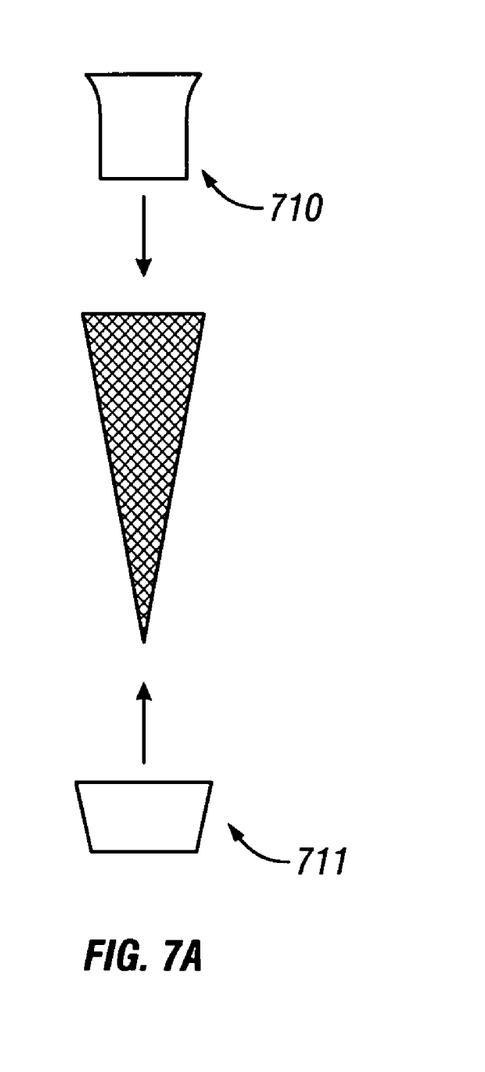
FIG. 7A shows a desoldering sheath, grommet and retaining ring.
Figure 7B:
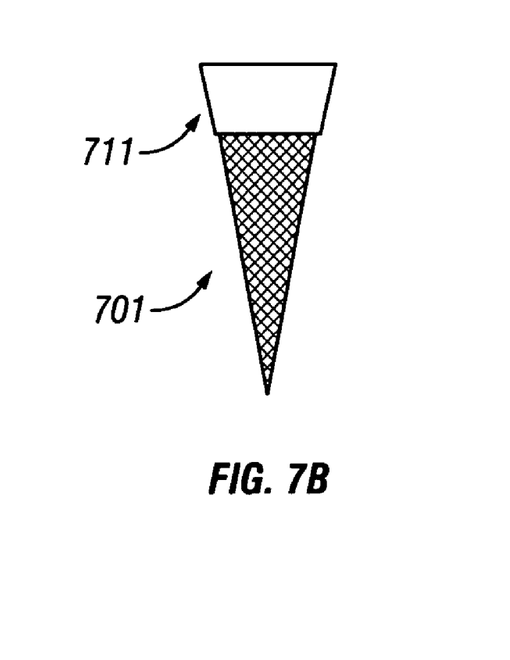
FIG. 7B shows a desoldering sheath fitted with the grommet and retaining ring.

FIGS. 7A and 7B show a desoldering sheath fitted with a grommet. In the preferred embodiment of the present invention, after the metal fabric has been cut into individual desoldering sheaths a grommet 710 is inserted into the wide end of the sheath 710. This grommet 710 reinforces the sheath 701 and helps maintain its shape as well as provides more secure mounting onto a soldering gun tip as depicted in FIG. 2. The grommet 710 is preferably made from the same material as the sheath 701 (e.g., copper) in order to facilitate heat transfer from the soldering gun tip to the desoldering sheath. A retaining ring 711 is fitted over the wide end of the sheath 701.

Figure 8A:
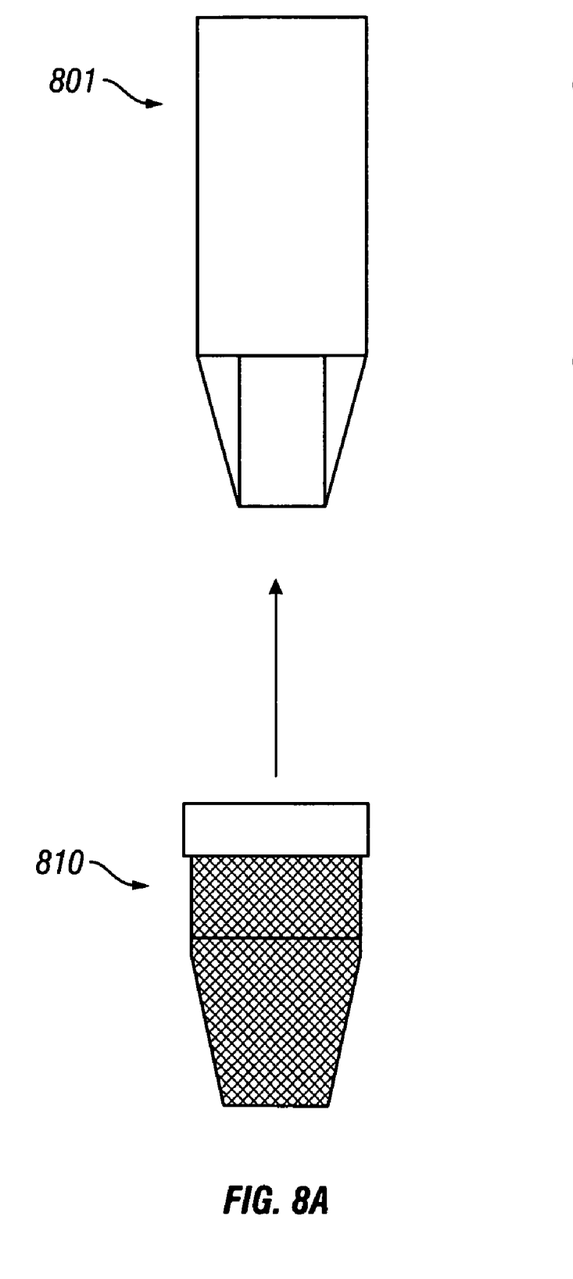
FIGS. 8A and 8B show a desoldering sheath being mounted onto a soldering gun tip.
Figure 8B:
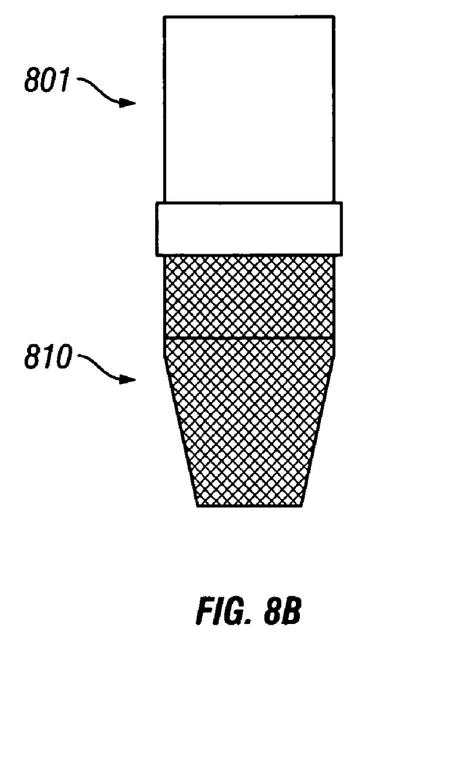

FIGS. 8A and 8B show a desoldering sheath 810 being mounted onto a soldering gun tip 801. In this example, the shape of the depicted desoldering sheath 810 is different from that shown in FIGS. 7A and 7B to illustrate how the metal fabric can be molded to any requisite shape, according to the soldering iron tip in question.

It is recommended that the desoldering sheath be dipped in flux before use to facilitate desoldering.

While the above description depicts the manufacture of a conical desoldering sheath, the method of the present invention can be used to manufacture a desoldering sheath with any kind of cross section shape or length (e.g., circular, triangular, rectangular, etc.).

Figure 9A:
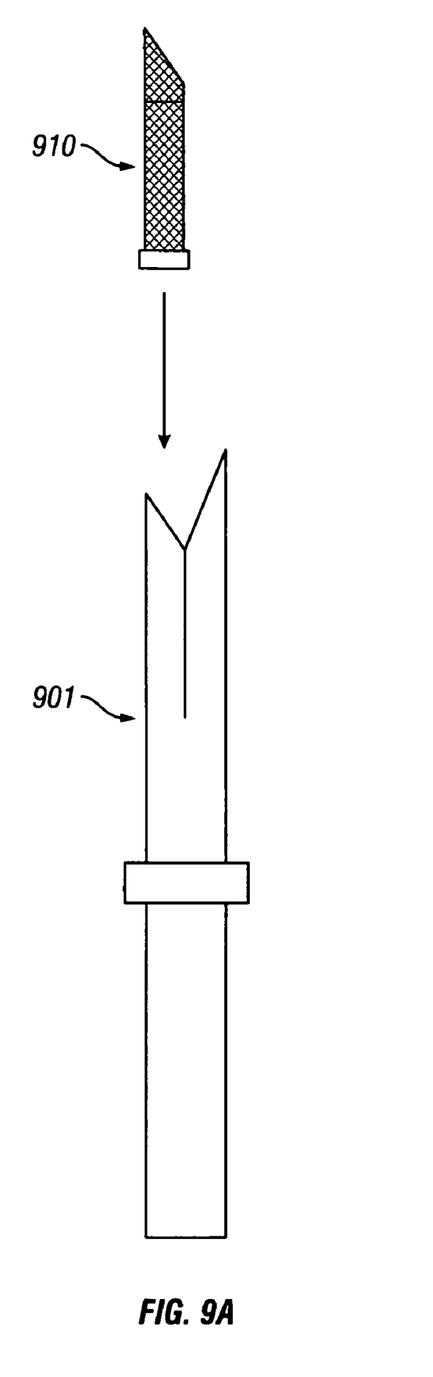
FIGS. 9A and 9B show a duel function soldering/desoldering iron and corresponding desoldering sheath.
Figure 9B:
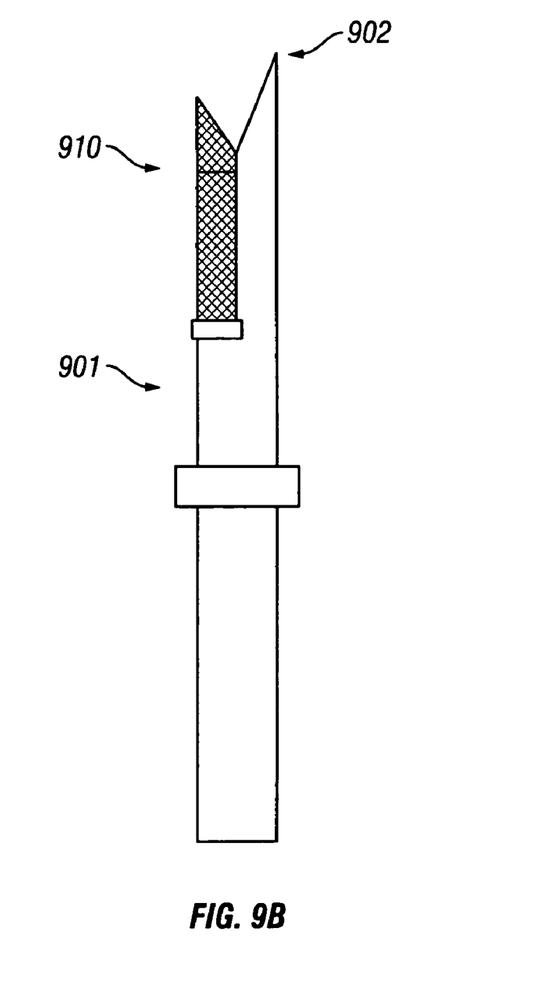

FIGS. 9A and 9B show another embodiment of the present invention comprising a duel function soldering/desoldering iron and corresponding desoldering sheath. The soldering iron 901 depicted in FIGS. 9A and 9B has a two-pronged tip that can hold a mounted desoldering sheath 910, while still leaving one of the tip prongs 902 exposed. This configuration allows the user to the soldering iron 901 concurrently for both soldering and desoldering operations, without the need to stop and mount a desoldering sheath whenever desoldering is necessary.

The soldering/desoldering iron depicted in FIGS. 9A and 9B can, for example, connect two pipes and then clean the area after soldering or disconnect the soldered parts and treat the area cleanly.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A desoldering system, comprising:
   (a) a soldering tool with an elongated tip; and
   (b) a desoldering sheath made from a plurality of metal ropes, wherein each metal rope is made from two or more fine-gauge wire threads and said metal ropes are woven together at least once to form a metal fabric that approximates the elongated shape of the soldering tool tip; and
   wherein the desoldering sheath is mounted over the soldering tool tip and conducts heat directly from the soldering tool tip to solder and absorbs molten solder by capillary action, wherein desoldering is carried out as a single-handed task.

2. The desoldering sheath according to claim 1, wherein the fine-gauge wire threads have a gauge range on 0.01 mm to 0.10 mm.

3. The desoldering sheath according to claim 1, wherein each metal rope comprises five to ten fine-gauge wire threads.

4. The desoldering sheath according to claim 1, wherein the fine-gauge wire threads are made from at least one of the following metals:
   copper;
   stainless steel;
   silver;
   gold.

5. The desoldering sheath according to claim 1, wherein the metal ropes are made by twisting the fine-gauge wire threads together.

6. The desoldering sheath according to claim 1, wherein the metal ropes are made by braiding the fine-gauge wire threads.

7. The desoldering sheath according to claim 1, wherein metal fabric is molded to conform to one of the following soldering tool tip shapes:
   cone-shaped;
   edge-shaped;
   angled-edge shaped
   square-shaped;
   rounded cone-shaped.

8. The desoldering sheath according to claim 1, wherein the metal fabric is formed by weaving the metal ropes two to five times.

9. The desoldering sheath according to claim 1, further comprising a grommet secured in the end of the desoldering sheath that is mounted over the soldering iron tip, wherein said grommet facilitates heat transfer from the soldering iron tip to the desoldering sheath.

10. The desoldering sheath according to claim 9, wherein the grommet is made of one of the following metals:
    copper;
    stainless steel;
    silver;
    gold.

11. A method for manufacturing a desoldering system, the method comprising:
    (a) coupling an elongated tip onto a soldering tool; and
    (b) forming a desoldering sheath from a plurality of metal ropes, wherein each metal rope is made from two or more fine-gauge wire threads, by weaving said metal ropes at least once around at least one mold to form a metal fabric that approximates the elongated shape of the soldering tool tip; and
    (c) mounting the desoldering sheath over the elongated soldering tool tip, wherein the desoldering sheath conducts heat directly from the soldering tool tip to solder and absorb molten solder by capillary action, wherein desoldering is carried out as a single-handed task.

12. The method according to claim 11, wherein the fine-gauge wire threads have a gauge range on 0.01 mm to 0.10 mm.

13. The method according to claim 11, wherein each metal rope comprises five to ten fine-gauge wire threads.

14. The method according to claim 11, wherein the fine-gauge wire threads are made firm at least one of the following metals:
    copper;
    stainless steel;
    silver;
    gold.

15. The method according to claim 11, wherein step (a) further comprises twisting the fine-gauge wire threads together to form the metal ropes.

16. The method according to claim 11, wherein step (a) further comprises braiding the fine-gauge wire threads to form the metal ropes.

17. The method according to claim 11, wherein metal fabric is molded to conform to one of the following soldering tool tip shapes:
cone-shaped;
edge-shaped;
angled-edge shaped
square-shaped;
rounded cone-shaped.

18. The method according to claim 11, wherein step (b) further comprises weaving the metal ropes two to five times.

19. The method according to claim 11, wherein step (b) further comprises:
(i) weaving the metal fabric around two or more molds that are strung together in a row;
(ii) after the metal fabric is woven, cutting the fabric at the points along its length where the molds meet; and
(iii) removing the molds, wherein the metal fabric retains the approximate shape of the molds.

20. The method according to claim 11, further comprising securing a grommet in the end of the desoldering sheath that is mounted over the soldering iron tip, wherein said grommet facilitates heat transfer from the soldering iron tip to the desoldering sheath.

* * * * *

UNITED STATES PATENT AND TRADEMARK OFFICE
CERTIFICATE OF CORRECTION

| | |
|---|---|
| PATENT NO. | : 7,441,687 B2 |
| APPLICATION NO. | : 11/368237 |
| DATED | : October 28, 2008 |
| INVENTOR(S) | : Criswell Hyunsoo Choi and Moon Gul Choi |

It is certified that error appears in the above-identified patent and that said Letters Patent is hereby corrected as shown below:

Col. 6, line 2, please delete the word "on" and replace with the word -- of --

Col. 6, line 57, please delete the word "on" and replace with the word -- of --

Col. 6, line 62, please delete the word "firm" and replace with the word -- from --

Signed and Sealed this

Thirtieth Day of December, 2008

JON W. DUDAS
*Director of the United States Patent and Trademark Office*